(12) United States Patent
Bickham et al.

(10) Patent No.: US 7,228,039 B2
(45) Date of Patent: Jun. 5, 2007

(54) HIGH SBS THRESHOLD OPTICAL FIBER WITH FLUORINE DOPANT

(75) Inventors: Scott Robertson Bickham, Corning, NY (US); Xin Chen, Corning, NY (US); Ming-Jun Li, Horseheads, NY (US); Donnell Thaddeus Walton, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/450,785

(22) Filed: Jun. 8, 2006

(65) Prior Publication Data

US 2006/0285809 A1    Dec. 21, 2006

Related U.S. Application Data

(60) Provisional application No. 60/691,179, filed on Jun. 15, 2005.

(51) Int. Cl.
  *G02B 6/02*    (2006.01)
(52) U.S. Cl. ............................... 385/123; 385/127
(58) Field of Classification Search ............... None
  See application file for complete search history.

(56) References Cited

U.S. PATENT DOCUMENTS

| | | | |
|---|---|---|---|
| 5,851,259 A | 12/1998 | Clayton et al. | 65/377 |
| 6,856,740 B2 * | 2/2005 | Balestra et al. | 385/123 |
| 2004/0096170 A1 * | 5/2004 | Papen et al. | 385/123 |
| 2006/0171648 A1 * | 8/2006 | Hasegawa | 385/127 |

OTHER PUBLICATIONS

"Performance of Strain-Free Stimulated Brillouin Scattering Suppression Fiber"; Journal of Lightwave Technology, vol. 14, No. 4, Apr. 1996; Kazuyuki Shiraki, et al.; p. 549-554.
"Brillouin-Gain Spectra for Single-Mode Fibers Having Various Core/Cladding Material Compositions"; Nori Shibata, et al; NTT Laboratories, 1-2356, Take Yokosuka-shi, Kanagawa-ken, 238-03, *Tokai, Ibaraki-ken, 319-11, Japan; 115-118.
"Wavelength Dependence of Brillouin-Gain Spectra for Single-Mode Optical Fibres"; Electronics Letter; Mar. 3, 1998; vol. 24; No. 5; p. 250-252; Y. Azuma et al.
"Stimulated Brillouin Scattering Suppression by Means of Applying Strain Distribution to Fiber with Cabling"; Nobuyuki Yoshizawa et al; Journal of Lightwave Technology, vol. 11; No. 10; Oct. 1993; p. 1518-1522.
"Backward Collinear Guided-Wave-Acousto-Optic Interactions in Single-Mode Fibers"; Journal of Lightwave Technology, vol. 7; No. 12; Dec. 1989; Cheng-Kuei Jen et al; p. 2018-2023.
"Single-Mode Fiber Optics"; Luc B. Jeunhomme; Photonetics; Marcel Dekker, NY 1990; p. 39-44.

* cited by examiner

*Primary Examiner*—Sung Pak
*Assistant Examiner*—Tina M. Wong
(74) *Attorney, Agent, or Firm*—Svetlana Z. Short

(57) ABSTRACT

The optical fiber comprises: (a) a core having a refractive index profile and a centerline; and (b) a cladding layer surrounding and directly adjacent the core; wherein core includes updoping material and is doped with F in at least one region of the core, such that either: (a) the average longitudinal acoustic wave velocity within the core is within 0.05% of the longitudinal acoustic wave velocity within the cladding; or (b) the longitudinal acoustic wave velocity at one region of the core is different from the longitudinal velocity at another region of the core by at least 0.2%.

16 Claims, 14 Drawing Sheets

HIGH SBS THRESHOLD OPTICAL FIBER WITH FLUORINE DOPANT

This application claims the benefit of priority under 35 U.S.C. § 119(e) of U.S. Provisional Application Ser. No. 60/691,179 filed on Jun. 15, 2005.

BACKGROUND OF THE INVENTION

1. Field of the Invention

The present invention relates to high SBS threshold optical fibers.

2. Technical Background

Stimulated Brillouin Scattering (SBS) is a dominant non-linear penalty in many optical transmission systems. In many systems, it is desirable to transmit large amount of optical power through optical fibers, while maintaining high signal to noise ratio (SNR). However, as the optical signal power launched into an optical fiber increases, the launch power may exceed a certain threshold power (SBS threshold) and part of the optical signal power will then be reflected due to SBS as a backward propagating signal. Thus, due to SBS, a large amount of the signal power can be lost due to reflection back toward the transmitter. In addition, the scattering process increases the noise level at the signal wavelength. The combination of decrease in signal power and increase in the noise both lower the SNR and lead to performance degradation.

At finite temperatures, thermal excitations in glasses occur similarly to that of phonons in crystals, and the interaction of these vibrational modes with low intensity signal light produces spontaneous Brillouin scattering. An intense optical field generates pressure or (acoustic) sound waves through electrostriction due to the beating of intense incident and spontaneous reflected light, giving rise to pressure or acoustic waves. The change in pressure causes material density to change, thereby resulting in refractive index fluctuations. The net result is that an intense electrical field component of the optical wave generates pressure or sound (acoustic) waves which cause material density fluctuations. The acoustic wave changes the refractive index and enhances the reflected light amplitude through Bragg diffraction. Above the SBS threshold level of an optical fiber, the number of stimulated photons is very high, resulting in a strong reflected field which limits the optical power that is transmitted, and which reduces the SNR.

SUMMARY OF THE INVENTION

Disclosed herein is an optical waveguide fiber having a high threshold for stimulated Brillouin scattering. According to some embodiments of the invention, the optical fiber comprises:
- a core having a refractive index profile and a centerline; and
- a cladding layer surrounding and directly adjacent the core;
- wherein core includes updoping material and is doped with F in at least one region of the core, such that either:
    (a) the average longitudinal acoustic wave velocity within the core is within 0.05% of the longitudinal acoustic wave velocity within the cladding; or
    (b) the longitudinal acoustic wave velocity at one region of the core is different from the longitudinal velocity at another region of the core by at least 0.2%.

According to some embodiments, the optical fiber comprises:
- a F doped core having a refractive index profile and a centerline, the core comprising a first region having an acoustic relative refractive index $\Delta_1$ and a second region directly adjacent the first region and having a relative acoustic refractive index $\Delta_2$ wherein $\Delta_1$ does not equal to $\Delta_2$, said two core regions having a substantially equal optical relative refractive index, and
- a cladding layer surrounding and directly adjacent the core;
- wherein the optical fiber has an attenuation at 1550 nm; wherein the refractive index of the core is selected to provide an overlap integral less than 0.8 at 1550 nm.

According to some embodiments, the optical fiber comprises:
- a F doped core having a refractive index profile and a centerline, the core comprising a first region having an acoustic relative refractive index $\Delta_1$ and a second region directly adjacent the first region and having a relative acoustic refractive index $\Delta_2$ wherein $\Delta_1$ does not equal to $\Delta_2$, said two core regions having a substantially equal optical relative refractive index, and
- a cladding layer surrounding and directly adjacent the core;

wherein one of first region has more than 0.1 mole % F and said second region has less than 0.1 mole % of F, and at least one of said regions is co-doped with Ge and F.

In one group of embodiments one of the core regions includes Ge doped silica and the adjacent core region includes Ge and F doped silica. For example, the central core region may include Ge doped silica and the adjacent core region surrounding the central core region includes Ge and F doped silica. In another example, the central core region includes Ge and F co-doped silica and the adjacent core region surrounding the central core region includes Ge doped silica and does not include F doped silica. In yet another example both regions are doped with both Ge and F, herein the amounts of Ge and F are different in these two regions. It is preferable that the cladding layer be a pure silica layer or a F doped silica.

Preferably the optical fiber described and disclosed herein allows suitable performance at a plurality of operating wavelength windows between about 1000 nm and about 1650 nm. In a preferred embodiment, the optical fiber described and disclosed herein is a dual window fiber which can accommodate operation in at least the 1310 nm window and the 1550 nm window.

Reference will now be made in detail to the present preferred embodiments of the invention, examples of which are illustrated in the accompanying drawings.

BRIEF DESCRIPTION OF THE DRAWINGS

FIG. 3b illustrates the longitudinal acoustic delta profile of the standard single mode optical of FIG. 3a;

FIG. 3c illustrates is a plot of optical and longitudinal acoustic fields of the optical fiber of FIG. 3a;

FIG. 4c illustrates the longitudinal acoustic delta profile of the optical fiber according to the present invention that has the optical delta profile shown in FIG. 4a;

FIG. 14 illustrates the longitudinal acoustic delta profile of an embodiment of the optical fiber according to the present invention, that has the optical delta profile shown in FIG. 4a;

FIG. 20 is a plot of the longitudinal acoustic velocity through the core and cladding of an optical fiber according to one embodiment of the present invention that has the optical delta profile of FIG. 3a;

DETAILED DESCRIPTION OF THE EMBODIMENTS

Figure 1:
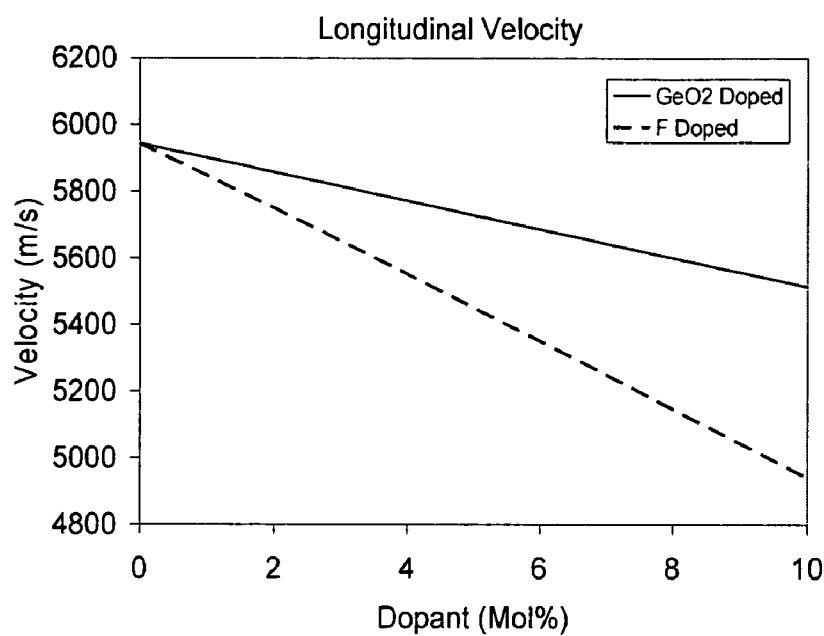
FIG. 1 is a plot of the longitudinal acoustic velocity as a function of dopant concentration(mole %) for Ge and F doped silica glass.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

As used herein, the relative refractive index is represented by Δ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Effective area" is defined as:

$$A_{eff} = 2\pi (\int f^2(r) r dr)^2 / (\int f^4(r) r dr)$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The mode field diameter (MFD) is measured using the Peterman II method wherein, 2w=MFD, and $w^2 = (2\int f^2(r) r dr / \int [df(r)/dr]^2 r dr)$, the integral limits being 0 to ∞.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39–44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the optical $LP_{11}$ and $LP_{02}$ modes. $LP_{11}$ and $LP_{02}$ are generally not distinguished in measurements, but both are evident as steps in the spectral measurement, i.e. no power is observed in the mode at wavelengths longer than the measured cutoff. The actual fiber cutoff can be measured by the standard 2 m fiber optical cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

Unless otherwise noted herein, optical properties (such as dispersion, dispersion slope, etc.) are reported for the LP01 mode.

When an optical wave propagates in an optical waveguide in which acoustic modes are present, the optical wave is scattered by the acoustic wave. The electric field that describes the SBS satisfies the nonlinear wave equation:

$$\nabla^2 \tilde{E} = \mu_0 \varepsilon_0 \varepsilon \frac{\partial^2 \tilde{E}}{\partial t^2} + \mu_0 \frac{\partial^2 \tilde{P}_{NL}}{\partial t^2} \quad (1)$$

$$\tilde{P}_{NL} = \frac{\gamma}{\rho_0} \tilde{\rho} \tilde{E} \quad (2)$$

where $\varepsilon = \varepsilon_r - i\varepsilon_i$ is complex dielectric constant, $P_{NL}$ is the nonlinear polarization due to the interaction between the electrical field and acoustic field, $\rho_0$ is the material density, $\tilde{\rho}$ is the density fluctuation caused by the acoustic wave, which satisfies the nonlinear acoustic wave equation:

$$\frac{\partial^2 \tilde{\rho}}{\partial t^2} = \left(V_L^2 + \Gamma \frac{\partial}{\partial t}\right) \nabla^2 \tilde{\rho} - \frac{\gamma}{2} \nabla^2 \tilde{E}^2 \quad (3)$$

where $\gamma$ is electrostrictive coefficient, $\Gamma$ is the damping factor, and $V_L$ is the longitudinal acoustic velocity. The electric field can be written in the following form:

$$\tilde{E} = A_P(z) E_p(r,\theta) e^{i(\omega_p t - \beta_p z)} + A_P(z) E_s(r,\theta) e^{i(\omega_s t + \beta_s z)} + c.c. \quad (4)$$

where $E_j$(j=p,s) is the transverse electric filed distribution that satisfies the mode equation $$\nabla_t^2 E_j + (\mu_0 \varepsilon_0 \varepsilon_r \omega_j^2 - \beta_j^2) E_j = 0 \quad (5)$$

$\omega_j$(j=p,s) is the optical frequency, $\beta_j$(j=p,s) is the optical propagation constant, p denotes the pump signal, and s denotes the Brillouin scattering signal. Without the electric field, the acoustic wave equation has a set of modal solutions $\rho_\mu$. With the electric field in Eq. (4), we assume a solution of the following form $$\tilde{\rho} = \sum_u A_u(z) \rho_u(r,\theta) e^{i(\Omega_u t - B_u z)} + c.c. \quad (6)$$

where $\Omega$ is the acoustic frequency and the B is the propagation constant of the acoustic mode. Neglecting the damping factor, the mode $\rho_\mu$ satisfies $$\nabla_t^2 \rho_u + \left(\frac{\Omega_u^2}{V_L^2} - B_u^2\right) \rho_u = 0 \quad (7)$$

From the above equations we can derive the equations for the optical power changes for the pump and the signal:

$$\frac{dP_p}{dz} = -\alpha_0 P_p - \sum \frac{1}{2}[g_u(e^{i\Delta\beta_u z - \alpha_u z} - 1) + g_u^*(e^{-i\Delta\beta_u z - \alpha_u z} - 1)]P_p P_s \quad (8)$$

$$\frac{dP_s}{dz} = \alpha_0 P_s - \sum \frac{1}{2}[g_u(e^{i\Delta\beta_u z - \alpha_u z} - 1) + g_u^*(e^{-i\Delta\beta_u z - \alpha_u z} - 1)]P_p P_s \quad (9)$$

where $g_u$ is the SBS gain coefficient due to acoustic mode number u $$g_u = \frac{g_0 \bar{I}_u^{ao}}{(\alpha_u - i\Delta\beta_u) K A_{eff}} \quad (10)$$

where go is a parameter determined by the material, $\alpha_u$ is the loss of the acoustic mode, $\Delta\beta_u$ is the phase mismatch between the acoustic and optical modes, $A_{eff}$ is optical effective area, $$A_{eff} = \frac{\left(\int E_0 E_0^* r\, dr\, d\theta\right)^2}{\int (E_0 E_0^*)^2 r\, dr\, d\theta} \quad (11)$$

and $\bar{I}_u^{ao}$ is the normalized overlap integral between the electric (optical) and longitudinal acoustic fields $$\bar{I}_u^{ao} = \frac{\left(\int E_0 E_0^* \rho_u^* r dr d\theta\right)^2}{\int (E_0 E_0^*)^2 r dr d\theta \int \rho \rho^* r dr d\theta} \quad (12)$$

Equation (10) shows that the SBS gain coefficient depends on two parameters that are related to fiber design: one is the optical effective area $A_{eff}$, the other is the overlap integral $\bar{I}_u^{ao}$ between the optical and the longitudinal acoustic fields. To reduce the SBS effect, one can increase the optical effective area (thus reducing optical power density), or decrease the overlap integral.

To capture the effects from both the optical effective area and the overlap integral, we define a figure of merit (FOM) by taking the ratio of optical effective area over the overlap integral:

$$FOM = \frac{A_{eff}}{\bar{I}_u^{ao}} \quad (13)$$

The figure of merit can be used to gauge the SBS improvement from one optical fiber (reference fiber) to another optical fiber.

The SBS power grows exponentially with fiber length. For uniform Brillouin frequency shift along the fiber, the peak SBS power threshold is inversely proportional to the gain coefficient and fiber effective length:

$$P \propto \frac{1}{g_u L_{eff}} = \frac{K\alpha_u A_{eff}}{g_0 \bar{I}_u^{ao} L_{eff}} = \frac{K\alpha_u F}{g_0 L_{eff}} \quad (14)$$

where $L_{eff}$ is the effective length of fiber defined by $$L_{eff} = \frac{1 - e^{-\alpha_o L}}{\alpha_o},$$

where $\alpha_o$ is the optical attenuation coefficient and L is the fiber length.

In order to improve the SBS performance of an optical fiber, the figure of merit FOM should be designed to take a larger value than a conventional fiber without the optimized performance in SBS. The ratio of the F of the fiber being designed to that of a reference fiber is the factor that the SBS threshold is improved. It is also converted into dB unit as described in this invention disclosure.

It can be seen from Equations (5) and (7) that the optical field and longitudinal acoustic field are governed by similar type of scalar wave equations. The two equations can be written in the same form for the fundamental optical mode and the acoustic mode with no azimuthal variation that are involved in the SBS $$\frac{d^2 f_o}{dr^2} + \frac{1}{r}\frac{df_o}{dr} + k_o^2(n_0^2(r) - n_{oeff}^2)f_o = 0 \quad (15a)$$

$$\frac{d^2 f_a}{dr^2} + \frac{1}{r}\frac{df_a}{dr} + k_a^2(n_a^2(r) - n_{aeff}^2)f_a = 0 \quad (15b)$$

where the subscript o stands for the optical field and subscript a stands for the acoustic field. For an optical mode, $f_o$ is the optical field distribution, $n_o(r)$ describes the refractive index as a function of the radial position, and $k_o$ is the optical wave number, which is linked to the optical wavelength by $2\pi/\lambda$.

For an acoustic mode, $f_a$ is the acoustic field distribution and the acoustic refractive index is defined as $$n_a(r) = \frac{V_{clad}}{V_L(r)}, \quad (16)$$

where $\lambda$' is the acoustic wavelength.

In practice, the (optical) refractive index profile is often described by the optical delta profile (optical refractive index delta profile) or delta % ($\Delta\%$). We can also similarly define the delta for the acoustic refractive index so that each optical refractive index profile is also associated with a corresponding acoustic delta profile that describes the acoustic behavior of longitudinal acoustic field. Using the index definitions for the optical and acoustic waves, we can describe the optical delta profile and acoustic Delta Profiles using the following equation:

$$\Delta_o = \frac{n_o^2(r) - n_{oc}^2}{2n_o^2(r)} \times 100\%, \quad (18)$$

$$\Delta_a = \frac{n_a^2(r) - n_{ac}^2}{2n_a^2(r)} \times 100\%$$

Where subscript "o" stands for optical wave and a stands for acoustic wave, and c" denotes the index for the cladding.

The optical refractive index of the core as the function of the Ge doping concentration is described by the following equation, $$n(W_{Ge}, W_F) = n_o(1 + 1.0 \times 10^{-3} \ast W_{Ge} - 3.3 \times 10^{-3} W_F) \quad (19),$$

where $W_{GeO2}$ is the mole percent of the Ge dopant, and $W_F$ is the mole percent of the Fluorine dopant. It is clear that the Ge doping contribute to the increase the refractive index from that of pure silica, and the Fluorine dopant contributes the decrease of the refractive index from that of the pure silica. The role of the Ge and F doping on the longitudinal acoustic velocity takes the following form, $$V_L(W_{Ge}, W_F) = 5944 \times (1 - 7.2 \times 10^{-3} \ast W_{Ge} - 2.7 \times 10^{-2} \ast W_F) \quad (20),$$

where the longitudinal acoustic velocity is in the unit of m/s.

We have designed waveguides with robust optical properties and large acousto-optic effective areas. Measurements of a large number of fabricated optical fibers have verified the connection between acousto-optic effective area and the SBS gain factor.

An optical waveguide fiber which is optically single-moded at a particular wavelength may be multi-moded acoustically at the same optical wavelength (assuming $\lambda = 1.55$ μm) because the acoustic wavelength corresponding to Brillouin frequency is of the order of 0.55 microns, which is quite small compared to typical optical waveguide fiber dimensions. (See Eqs. (16) and (17). In the case of spontaneous Brillouin scattering at relatively low launch powers, the incident optical field is Brillouin scattered by each of the acoustic modes and Brillouin gain spectrum shows peaks corresponding to optical field interaction with each of the acoustic modes. At relatively high launch powers, the SBS threshold is exceeded, and one of the acoustic modes typically becomes dominant while the other acoustic modes do not survive the mode competition, leading to the onset of stimulated Brillouin scattering.

As coupling between the optical mode field and the acoustic mode field(s) increases, more optical power is undesirably reflected opposite to the direction of optical signal transmission.

As disclosed herein, the coupling between the optical and acoustic modes is preferably reduced via the refractive (i.e., optical) and acoustic index profiles of the optical fiber disclosed herein. In some embodiments, optical mode field remains extended while acoustic fields become more tightly confined to one region of the core to reduce overlap between the optical mode field and the acoustic fields. In some embodiments the confinement of acoustic power in the core is reduced by spreading the acoustic field, which is achieved by matching the acoustic velocity in the core and cladding (i.e., making theses velocities the same or essentially the same).

Thus, in some of the embodiments of the present invention, the optical fiber 10 disclosed herein (see FIG. 4a) tends to pull the mode field of the dominant acoustic mode field (for example, $L_{01}$) either (a) in toward the centerline of the optical fiber, or (b) outward towards the edge of the core 12, resulting in reduced coupling between the acoustic and optical fields. Preferably, the optical fiber 10 also tends to pull the mode field of the next dominant acoustic mode field (typically $L_{02}$) either (a) in toward the centerline of the optical fiber, or (b) outward towards the edge of the core, resulting in reduced coupling between this next dominant acoustic mode field and the optical field. In the other embodiments, the acoustic velocity of the core and the cladding are about the same, and the acoustic field extends over the cladding, leaving much less acoustic energy in the core, minimizing the overlap integral between the optical and acoustic fields.

The Brillouin frequency for optical fiber as disclosed herein is preferably between about 9.5 to 12 GHz, for the 1550 nm wavelengths (and is higher when measured at shorter wavelengths).

We have found that a higher dopant concentration of the materials that reduce acoustic field velocity (for example Ge and F), at or near the optical fiber centerline, and in particular in a central portion of the core of the optical fiber, forces the acoustic modes to be more tightly confined in that core region (core region 12a). Higher concentration of these dopants near the edge of the core (region 12b) reduces acoustic field velocity in that region and shifts acoustic modes toward the edge of the core 12.

Preferably, the core 12 is comprised of silica doped with an optical index (of refraction) raising dopant, for example germanium, i.e. germania doped silica. At least one section of the core 12 is also co-doped with fluorine- i.e., it includes both Ge and F. Germania increases the optical refractive index while decreasing longitudinal acoustic velocity of the acoustic wavefront (thereby increasing "effective refractive index" of the acoustic wave). Fluorine decreases the optical refractive index while also decreasing longitudinal acoustic velocity of the acoustic wavefront (thereby increasing "effective refractive index" of the acoustic wave). Having at least one section of the core co-doped with both Ge and F achieves the desired optical refractive index (or refractive index delta) while changing the longitudinal acoustic velocity of the core, thus resulting in decreased overlap between the acoustic wave (field) and the optical wave (or field), decreasing the SBS. This approach allows us to keep the desired optical profile without changing the optical properties, while simultaneously changing/controlling the acoustic wave velocity and minimizing or eliminating SBS.

The core may comprise a first portion (core region 12a) extending from the centerline to a radius of about 2 μm. Alternatively the core may comprise a first portion (core region 12a) extending from the centerline to a distance of about 0.2r to 0.5r, where r is the core radius.

It is preferred, for optical transmission fiber, that peak or maximum (optical) refractive index delta is $0.3\% < \Delta_{MAX} < 1.4\%$, the optical effective area at 1550 nm between 50 and 140 μm², preferably larger than 80 μm², more preferably between 80 and 120 μm², even more preferably between 80 and 110 μm². It is preferred, for optical laser fiber, that peak or maximum refractive index delta $\Delta_{MAX}$ is about $0.05\% < \Delta_{MAX} < 0.3\%$, the optical effective area at 1550 nm between larger than 140 μm², preferably larger than 150 μm², more preferably between 159 and 2000 μm². It is preferred, for optical DC (dispersion compensating) fiber, that peak or maximum (optical) refractive index delta is about $1\% < \Delta_{MAX} < 3\%$, the optical effective area at 1550 nm between larger than 20 μm², preferably larger than 30 μm², more preferably between 30 and 40 μm². It is preferred, for nonlinear optical fiber that peak or maximum refractive index delta is about $1\% < \Delta_{MAX} < 3\%$, the optical effective area at 1550 nm is less than 40 μm².

As described above, SBS originates from the interaction between optical wave and acoustic wave. In a single optical fiber, the gain of SBS depends on the SBS spectrum and the overlap between the optical mode and acoustic modes. Thus, one way to reduce the overlap between the optical mode and acoustic modes by fiber profile designs is to allow the optical refractive index profile (delta % profile) to remain the same, while changing the acoustic delta profile of the fiber.

In order to form an acoustic waveguide within the fiber core, the longitudinal and shear acoustic velocities are lower in the fiber core than in the cladding. This is normally the case for optical fibers with a typical step index Ge updoped core (and no co-dopants).

Figure 2:
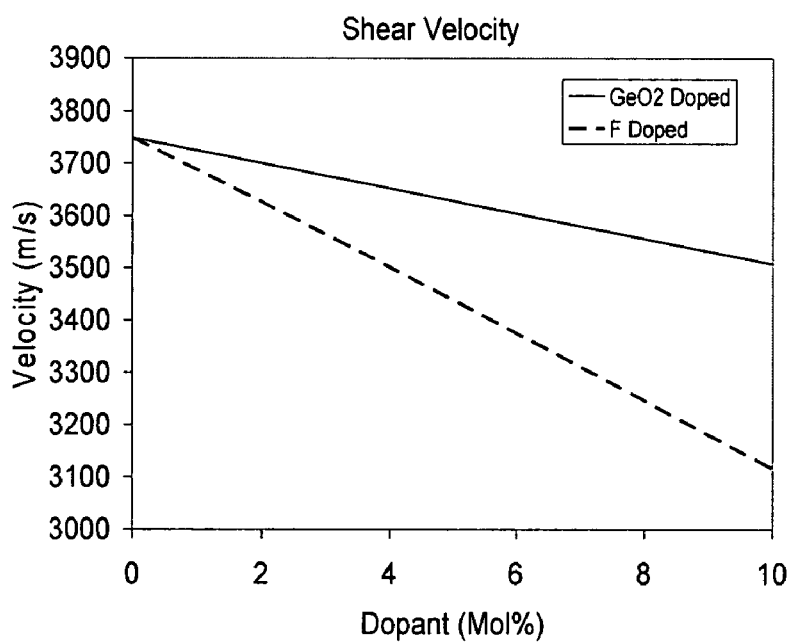
FIG. 2 is a plot of the shear acoustic velocity as a function of dopant concentration for Ge and F doped silica glass.
Figure 3A:
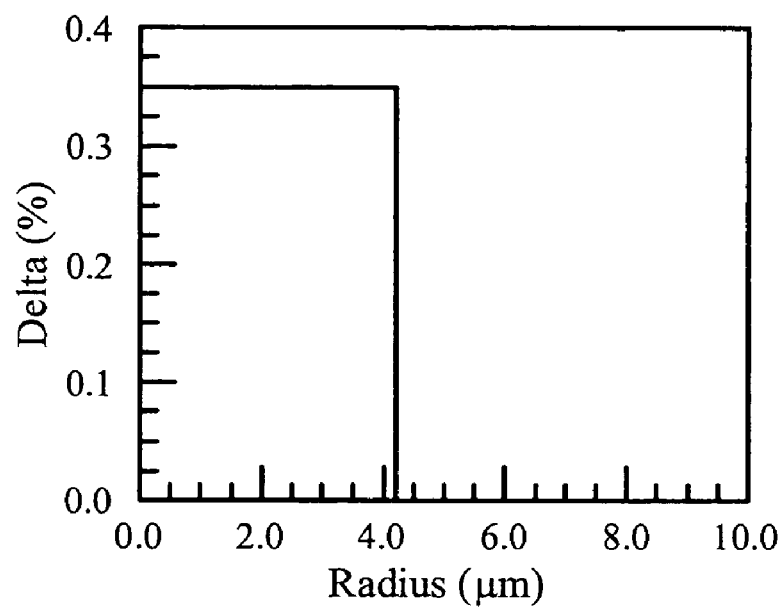
FIG. 3a illustrates the optical delta profile of a standard single mode optical fiber.

To illustrate this, the solid lines in FIG. 1 and FIG. 2 illustrate longitudinal and shear acoustic velocity changes with Ge concentration in silica glass. It can be seen from these figures that the both the longitudinal and shear acoustic velocities decrease with the increase of Ge in the glass. Because the interaction between the acoustic wave and optical wave is dominated by the longitudinal acoustic wave, in the following paragraphs, we discuss the longitudinal acoustic wave only. For a standard single mode fiber the optical delta profile is typically a step function as shown in FIG. 3a. The core of the fiber shown in FIG. 3a is doped with about 4.2 mol % Ge, which results in a relative refractive (i.e., optical) index delta % of 0.35%, relative to pure silica cladding. This positive relative refractive index delta corresponds to the optical waveguiding core. This standard single mode fiber has a MFD of 10.22 μm, effective area of 80.13 μm², and chromatic dispersion of 16.71 ps/(nm.km) at 1550 nm. The core delta is due only to Ge The core includes no other dopants.

Figure 3B:
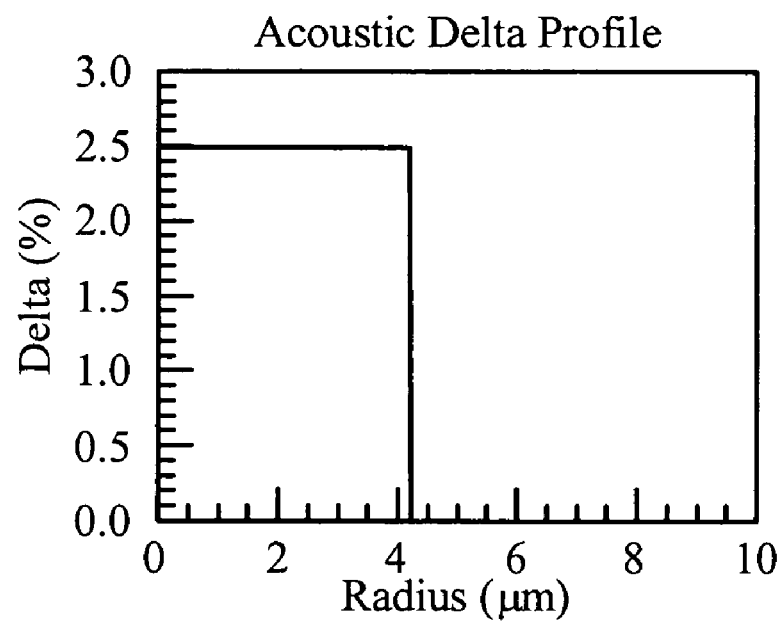
Figure 3C:
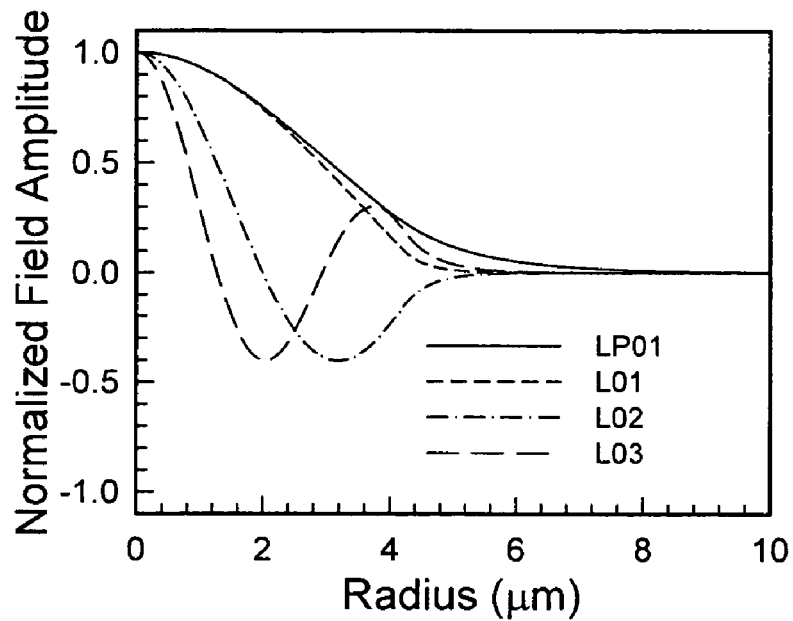

For acoustic waves, the relative longitudinal acoustic delta profile for this standard single mode fiber is shown FIG. 3b. FIGS. 3a and 3b illustrate that the longitudinal acoustic waves are guided inside the area of the same size as the size as the optical waveguiding core (i.e., approximately within the radius of 4.2 µm), which results in a large overlap between the fundamental optical field and lower order acoustic fields (and an overlap integral of about 0.97). Consequently, this type of fiber has a relatively large amount of SBS. The confinement of the $LP_{10}$, optical field and several lowest orders of the longitudinal acoustic fields for this fiber are shown in FIG. 3c.

In order to reduce SBS, the optical fiber 10, according to some embodiments of the present invention utilizes, in at least one region of a silica-based core 12, both an updopant (for example, Ge) and a downdopant (for example F), both of which decrease acoustic velocities. (This is illustrated in FIGS. 1 and 2) It is preferable that wherein one of the core regions has more than 0.1 mole % F and that an adjacent core region has less than 0.1 mole % of F, and that at least one of the regions is co-doped with Ge and F. Since Ge increases and F decreases the optical refractive index, by utilizing the combination of Ge and F, we can design fibers with the same refractive index profile as a typical single mode transmission fiber, but different acoustic delta profile. Of course, other types of fibers may also be designed by utilizing the same approach to provide the same optical delta profile, while having a different acoustic delta profile and, therefore, improved SBS. These optical fibers include DC fibers, laser fibers, and non-linear optical fibers. It is noted that co-dopants other than F may also be utilized, as long as they decrease the longitudinal acoustic velocity. One alternative to Fluorine is Boron ($B_2O_3$), which is a down-dopant that decreases the longitudinal velocity.

Figure 4A:
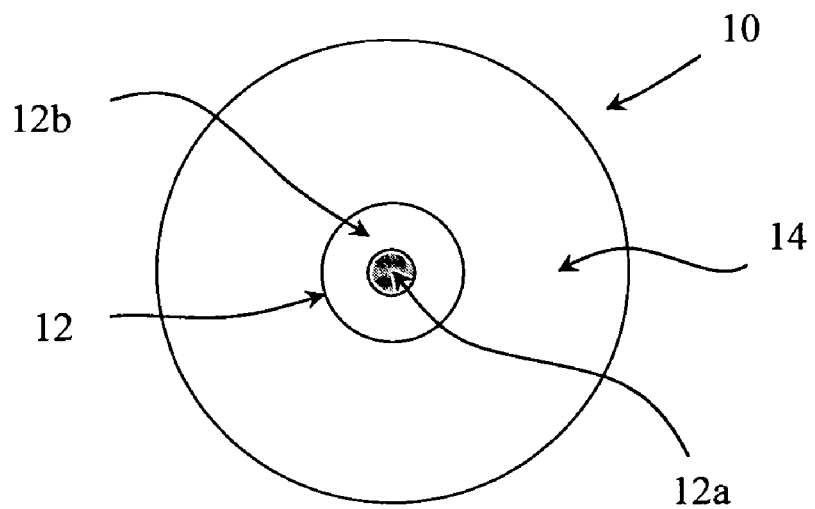
FIG. 4a is a schematic cross-sectional view of one embodiment of the optical fiber according to the present invention.
Figure 4B:
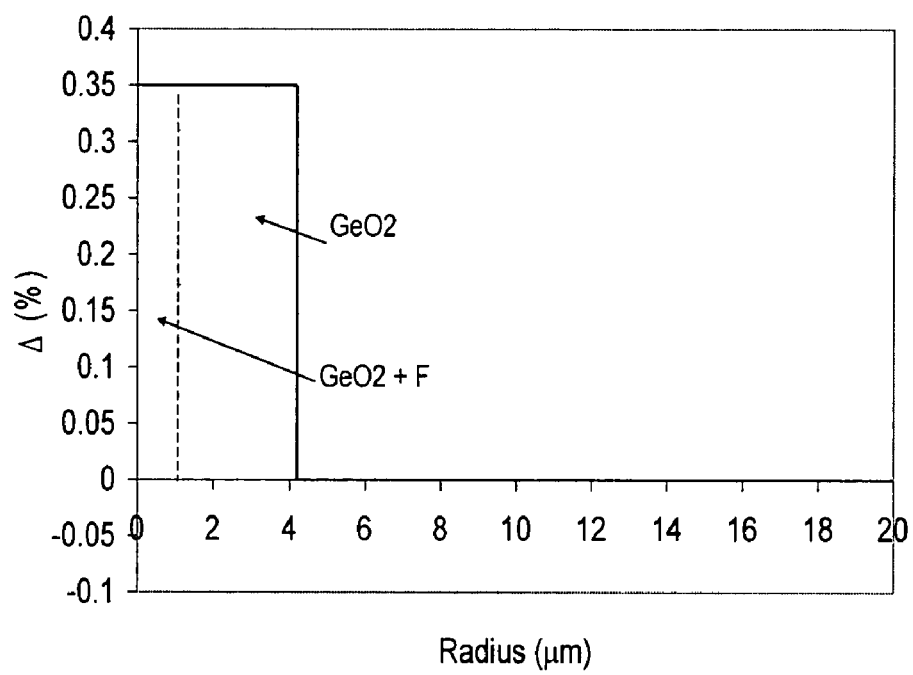
FIG. 4b illustrates the optical delta profile of a reduced SBS single mode fiber.

FIG. 4a illustrates an optical fiber 10 according to one embodiment of the present invention. FIG. 4b illustrates its optical delta profile. The optical delta profile of fiber 10 is the same as that of the standard single mode transmission fiber shown in FIG. 3a, except that both Ge and F were used in a central region 12a of the core 12. The dopant levels of Ge and F are selected such that the refractive index is the same as the rest of the core (region 12b) that does not contain F (is doped with Ge). Because the optical delta profile of this fiber 10 is the same as that of the standard single mode transmission fiber, the optical properties of this fiber remain the same as those for the standard single mode transmission fiber. In the optical fiber example of FIGS. 4a and 4b, the Ge and F levels in the central region 12a of the optical fiber core 12 are 4.94 mole %, and 0.223 mole %, respectively. The outer core region 12b is doped with 4.2% of Ge.

Figure 4C:
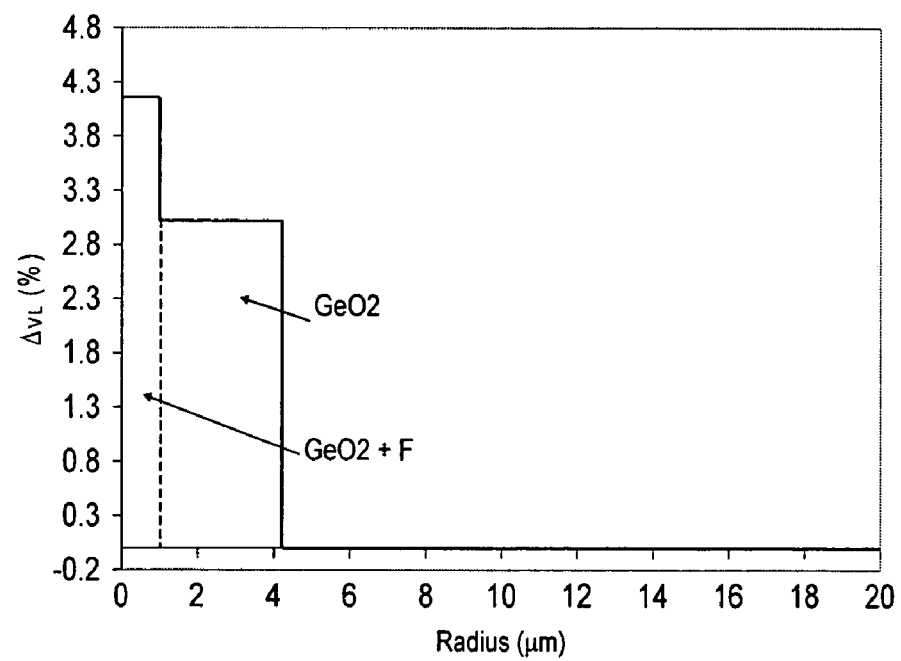

However, the longitudinal acoustic delta profile of the fiber 10 (corresponding to FIGS. 4a and 4b) is very different from the one doped with Ge only. The longitudinal acoustic delta profile of the fiber 10 is illustrated in FIG. 4c. Because both Ge and F decrease the acoustic velocity, the longitudinal acoustic delta profile has a peak in the center, which guides the lower order acoustic modes. As a result, the overlap between the fundamental optical mode and lower order acoustic modes is reduced and the SBS threshold is increased. The SBS threshold of fiber 10 (corresponding to FIGS. 4a-4c) is increased by more than 6 dB relative to that single mode transmission fiber. The approach for reducing SBS can be also applied to other more complicated segmented fiber core designs for NZDF applications.

Thus, optical fiber 10 according to this embodiment present invention utilizes silica doped core that includes fluorine and another index increasing co-dopant, such as Ge, form a narrower waveguide for the longitudinal acoustic wave than for the optical wave, so that the longitudinal acoustic field is much more confined near the center compared to the case without the introduction of fluorine. While the optical field is largely unaffected, the overlapping between the optical field and the longitudinal acoustic field is reduced, resulting in suppression of SBS effect and increase in SBS threshold. The SBS threshold of an optical fiber or a laser fiber relates to the total optical power that can be transmitted through the effective lengths of the optical fiber.

Optical fibers 10 disclosed herein have a reduced overlap integral of less than 0.8 at 1550 nm. Preferably, the overlap integral is less than 0.65. More preferably, the overlap integral is less than 0.5.

EXAMPLE 1

Confining the Longitudinal Acoustic Field

Figure 5:
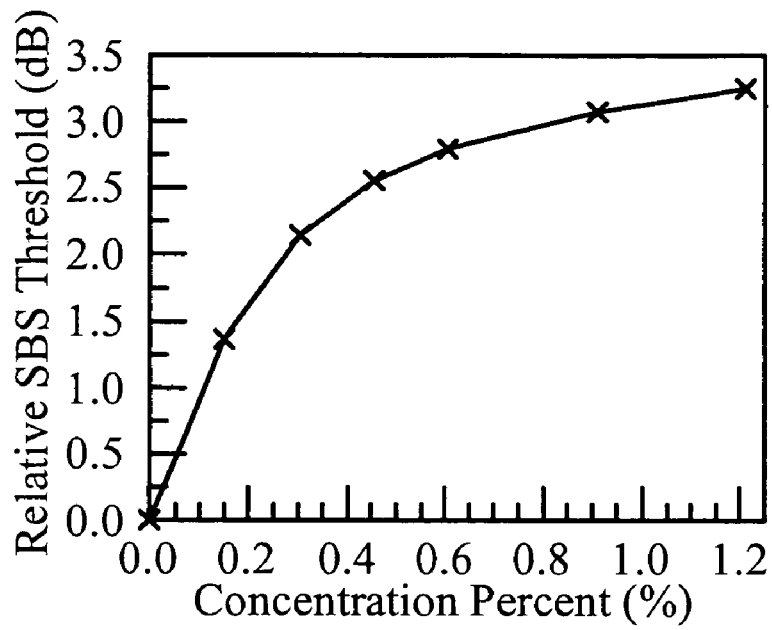
FIG. 5 is a graph of relative SBS threshold as a function of F concentration level (in the fiber core region having an outer radius of 2 μm.

We will compare the performance of the exemplary fibers 10 with that of a standard single mode transmission fiber (fiber 1), i.e., the fiber that does not contain F and which illustrated in FIGS. 3a to 3c. We doped the core region corresponding to the radius r=0 to 2 µm (with varying level of the Fluorine while maintaining the overall optical delta profile to be the same as the fiber of FIG. 3a, so that the optical properties of the fiber, including MFD, effective area, and dispersion were essentially unchanged. The modeling results are summarized in Table 1. We found that as we increase the level of Fluorine doping in the core region 12a, the SBS threshold relative to that in fiber 1 (corresponding to FIGS. 3a and 3b) increases monotonically, which is also shown in FIG. 5.

TABLE 1

| | 0–2 µm | | 2–4.2 µm | | | | | |
|---|---|---|---|---|---|---|---|---|
| Case No. | GeO2 Delta (%) | F Delta (%) | GeO2 Delta (%) | F Delta (%) | L01 FOM (µm²) | Power (P0) | Power Improvement (dB) | Overlap Integral |
| 1 | 0.35 | 0 | 0.35 | 0 | 82.21 | 1.00 | 0.00 | 0.97 |
| 2 | 0.4 | −0.05 | 0.35 | 0 | 112.59 | 1.37 | 1.37 | 0.71 |
| 3 | 0.45 | −0.1 | 0.35 | 0 | 134.72 | 1.64 | 2.15 | 0.59 |
| 4 | 0.5 | −0.15 | 0.35 | 0 | 147.99 | 1.80 | 2.55 | 0.54 |
| 5 | 0.55 | −0.2 | 0.35 | 0 | 156.31 | 1.90 | 2.79 | 0.51 |
| 6 | 0.65 | −0.3 | 0.35 | 0 | 167.10 | 2.03 | 3.08 | 0.48 |
| 7 | 0.75 | −0.4 | 0.35 | 0 | 173.61 | 2.11 | 3.25 | 0.46, | where Power (P0) stands for SBS threshold power, Power Improvement is SBS threshold power improvement, relative to first optical fiber of Table 1 (i.e., case 1), and the overlap integral is the overlap integral between the optical and acoustic field, as defined by Equation (12).

Figure 6:
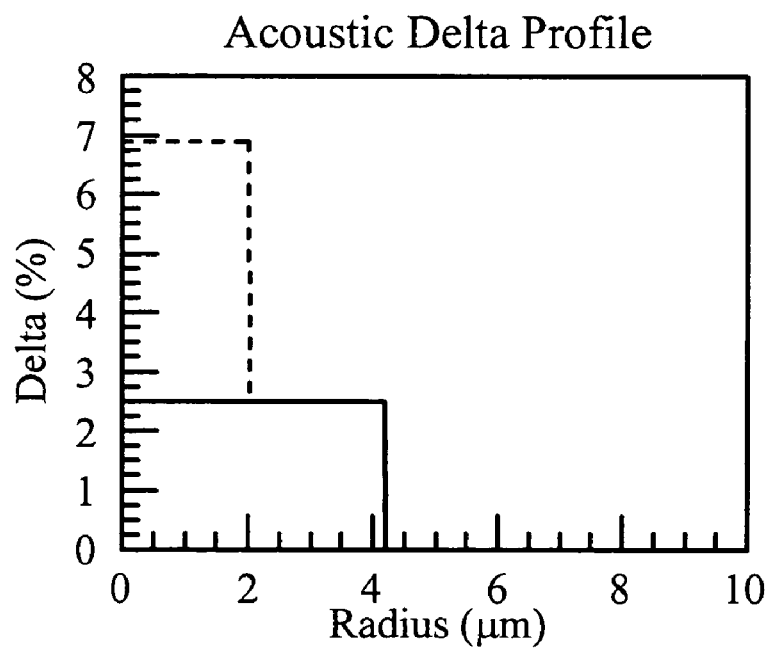
FIG. 6 illustrates acoustic delta profiles of a standard single mode fiber (solid lines) and of one embodiment of the optical fiber according to the present invention (dashed lines)
Figure 7:
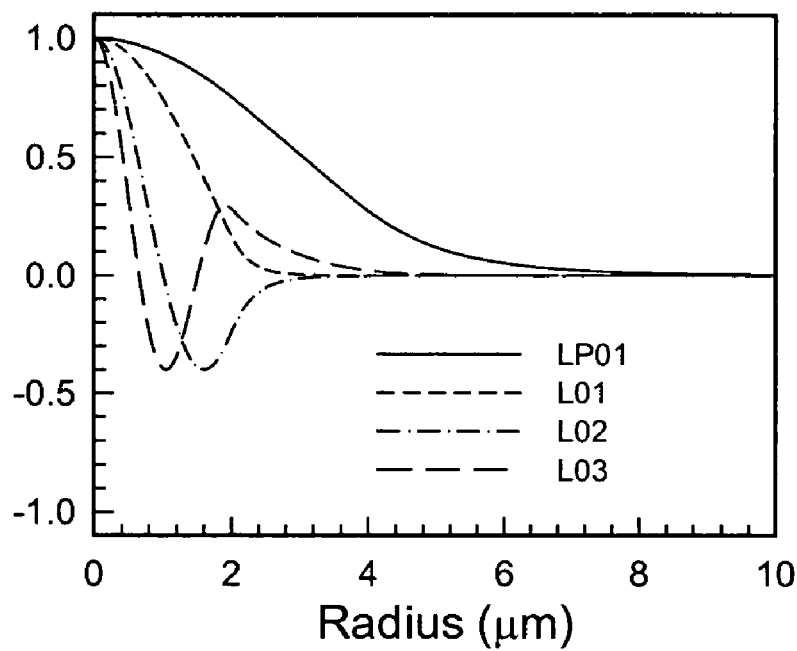
FIG. 7 is a plot of optical and longitudinal acoustic fields of the optical fiber that corresponds to the multi-step acoustic delta profile (dashed lines) of FIG. 6.

The mechanism of the improvement of SBS threshold can be understood by looking at the acoustic waveguide and the related field distribution. For example, the acoustic delta profile for the optical fiber 10 of the exemplary fiber 6 of Table 1 is shown in FIG. 6. We have found that, with fluorine co-doping, the acoustic delta increases significantly. This is indicated by the dashed lines in FIG. 6. Therefore, the core region 12a (r<2 µm) forms a narrower waveguide for the acoustic field, while the optical fields still see the same optical wave-guiding core 12. FIG. 7 illustrates the optical and acoustic fields as a function of radius. It is found that the fundamental acoustic field (L01) is essentially confined to the region of the core 12a with a radius of less than 2.5 microns, while the optical field is unchanged. This increases the figure of merit FOM that impacts the overall SBS performance. The higher order acoustic fields are oscillating in nature. The overlap of higher order acoustic fields with the optical field ($LP_{01}$) is very small, because their positive contribution of higher order acoustic fields is largely cancelled by their negative contribution. For the optical fiber of example 6 the overlap integral between the optical and acoustic fields is 0.48. For the optical fiber of example 5 in Table 1 the overlap integral between the optical and acoustic fields is 0.5 1. The Pin Array bending and the lateral load bending loss for the optical fibers 10 of example 1 are 7.9 dB and 0.45 dB/km, respectively, at 1550 nm and the cut-off wavelength is at or below 1.3 µm.

EXAMPLE 2

Pushing the Acoustic Field away from the Center

Figure 8:
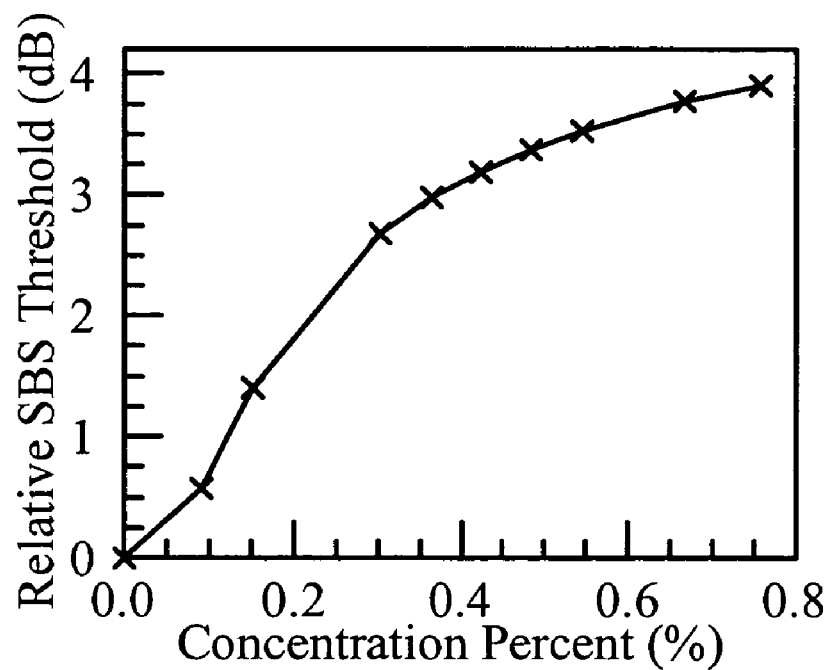
FIG. 8 is a graph of relative SBS threshold as a function of F doping concentration level (in the optical core region corresponding to the radius r between 2.5 and 4.2 μm)

In this example, we explore another mechanism to reduce the SBS effect. Again, we use the Ge doped step index fiber in FIG. 3a as a reference fiber. But in these embodiments we co-doped the core region 12b (r=2.5 to 4.2 microns) with fluorine dopant while leaving the core region 12a (the core region with the radius of up to 2.5 microns) unchanged. We found that as we increase the doping level of Fluorine in the region 12b as shown in Table 2, the SBS threshold increases monotonically as in FIG. 8.

where Power (P0) stands for SBS threshold power, Power Improvement is SBS threshold power improvement, relative to first optical fiber of Table 2 (i.e., case 1), and the overlap integral is the overlap integral between the optical and acoustic field, as d by equation (12).

Figure 9:
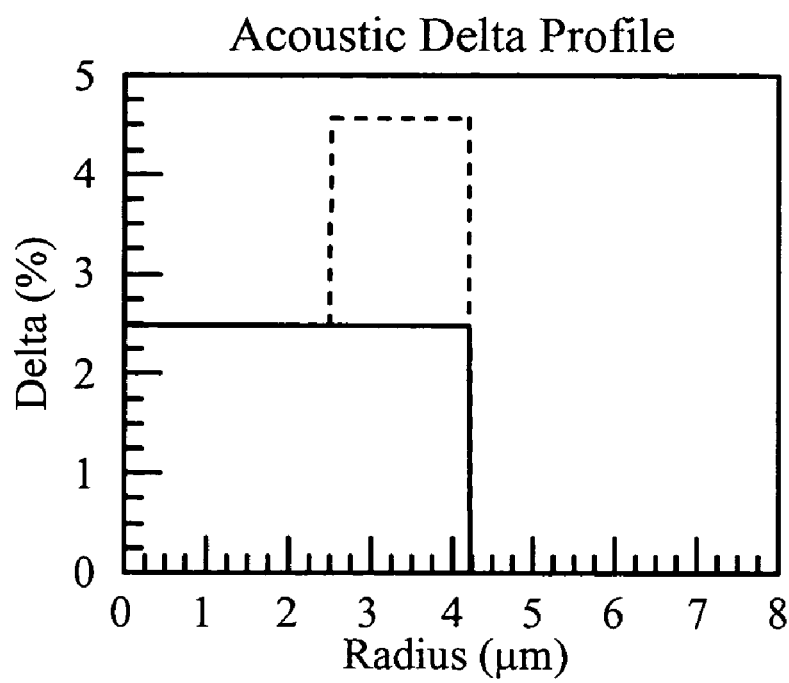
FIG. 9 illustrates acoustic delta profiles of a standard single mode fiber (solid lines) and of another embodiment of the optical fiber according to the present invention (dashed lines)
Figure 10:
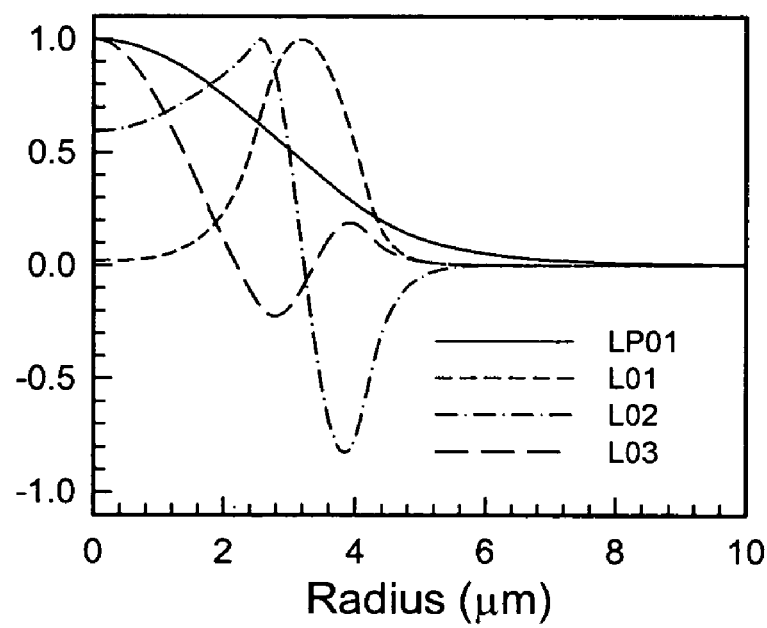
FIG. 10 is a plot of optical and longitudinal acoustic fields of the optical fiber that corresponds to the multi-step acoustic delta profile (dashed lines) of FIG. 9.

The mechanism of the improvement of SBS threshold by co-doping a core region that is not a centermost core region can be understood by looking at the acoustic waveguide and the related field distribution of the optical fiber examples depicted in Table 2. For example, the acoustic delta profile for the optical fiber 10 of the exemplary fiber #12 of Table 1 is shown in FIG. 9. We have found that, with the fluorine co-doping in the core region 12b, the acoustic delta increases significantly. Therefore, acoustic delta of the core region 12a (r=0 to 2.5 microns) is depressed relative to that of the region 12b (r=2.5 to 4.2 microns), while the optical fields still see the same optical waveguiding core. This acoustic delta profile would result in the fundamental acoustic field being pulled away from the center of the fiber core 12. FIG. 10 illustrates optical and acoustic fields as a function of fiber radius for the fiber of FIG. 9. We found that the fundamental acoustic field L01 is pushed away from the center of the core towards the edge of the core, while the optical field is unchanged. Since the optical field is mostly near the center of the fiber (i.e., in the core region 12a), by moving the fundamental acoustic field away from the center of the fiber core, we reduce the overlap between the $LP_{01}$ and $L_{01}$ fields and increase the FOM that gauges the SBS performance. The higher order acoustic fields are oscillating in nature. The overlap of such fields with the optical field (e.g., $LP_{01}$) is very small, because their positive contribution is largely cancelled by their negative contribution. For the optical fiber of optical fiber example #12 from Table 2 the overlap integral between the optical and acoustic fields is 0.47. The Pin Array bending and the lateral load bending loss for the optical fiber 10 of this example are 7.9 dB and 0.45 dB/km, respectively, at 1550 nm. The optical fiber examples of Table 2 have a cut-off wavelength at or below 1.3 µm.

In the above examples, we have used a multiple step acoustic delta profile to illustrate that doping at least one core region with at least two dopants, while leaving one core region doped with a single updopant, such as Ge, for example, improves the SBS threshold of optical fibers 10. Preferably, the two regions 12a and 12b are adjacent to one another, and because the acoustic delta profile is a multi-step

TABLE 2

| | 0–2.5 µm | | 2.5–4.2 µm | | | | | |
|---|---|---|---|---|---|---|---|---|
| Case No. | GeO2 Delta (%) | F Delta (%) | GeO2 Delta (%) | F Delta (%) | L01 FOM (µm$^2$) | Power (P0) | Power Improvement (dB) | Overlap Integral |
| 1 | 0.35 | 0 | 0.35 | 0 | 82.21 | 1 | 0.00 | 0.97 |
| 8 | 0.35 | 0 | 0.38 | −0.03 | 93.87 | 1.14 | 0.58 | 0.85 |
| 9 | 0.35 | 0 | 0.4 | −0.05 | 113.66 | 1.38 | 1.41 | 0.70 |
| 10 | 0.35 | 0 | 0.45 | −0.1 | 152.44 | 1.85 | 2.68 | 0.53 |
| 11 | 0.35 | 0 | 0.47 | −0.12 | 163.00 | 1.98 | 2.97 | 0.49 |
| 12 | 0.35 | 0 | 0.49 | −0.14 | 171.29 | 2.08 | 3.19 | 0.47 |
| 13 | 0.35 | 0 | 0.51 | −0.16 | 178.50 | 2.17 | 3.37 | 0.45 |
| 14 | 0.35 | 0 | 0.53 | −0.18 | 184.84 | 2.25 | 3.52 | 0.43 |
| 15 | 0.35 | 0 | 0.57 | −0.22 | 196.00 | 2.38 | 3.77 | 0.41 |
| 16 | 0.35 | 0 | 0.6 | −0.25 | 202.02 | 2.46 | 3.90 | 0.40 | profile, the longitudinal acoustic wave velocities within the two core regions 12a and 12b differ from one another, preferably by at least 0.2%.

For example, the central core region 12a may includes Ge doped silica and the adjacent core region 12b surrounding the central core region 12 a may includes both Ge and F. Alternatively, the central core region 12a may include Ge and F codoped silica and the adjacent core region 12b surrounding the central core region includes Ge doped silica and does not include F doped silica. Alternatively, the optical fiber may have at a least two adjacent regions 12a and 12b that are both doped with Ge and F, but the amounts of Ge and F should be different in these two regions, so that longitudinal acoustic wave velocities within the two core regions 12a and 12b differ, preferably by at least 0.2%.

In actual manufactured fibers, the boundary between different regions 12a and 12b would not be as sharp as shown in the above examples. However, the approach for minimizing SBS will still work. For a skilled person in the art, the adjustment can be made in a straightforward way to accommodate those situations. Additional fiber core regions can also be added as long as the at least one of the core regions is codoped with both Ge and F, or other similar dopants.

EXAMPLE 3

NZDSF Type of Fibers

Figure 11:
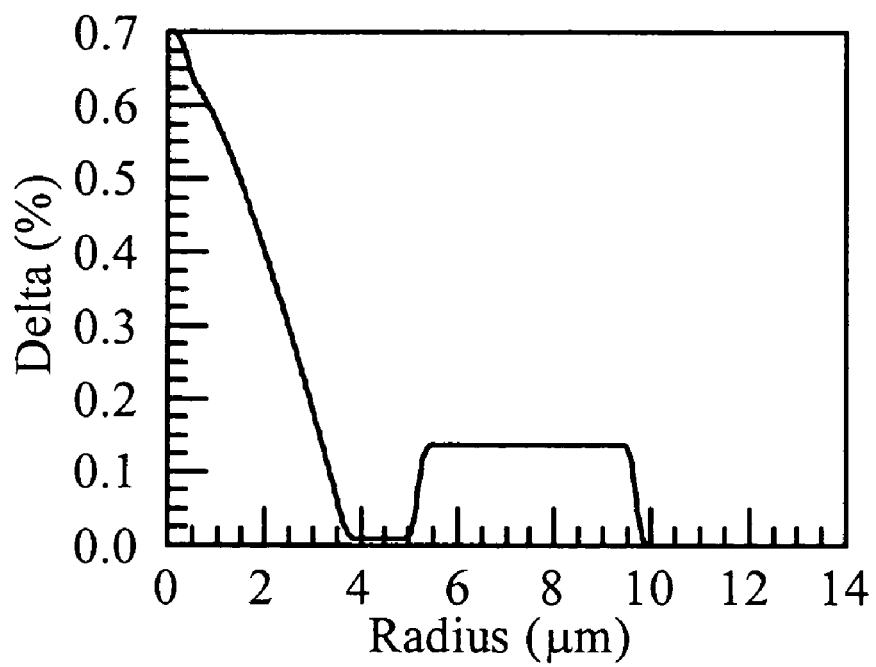
FIG. 11 illustrates the optical delta profile a standard non zero dispersion shifted fiber (NZDF)
Figure 12:
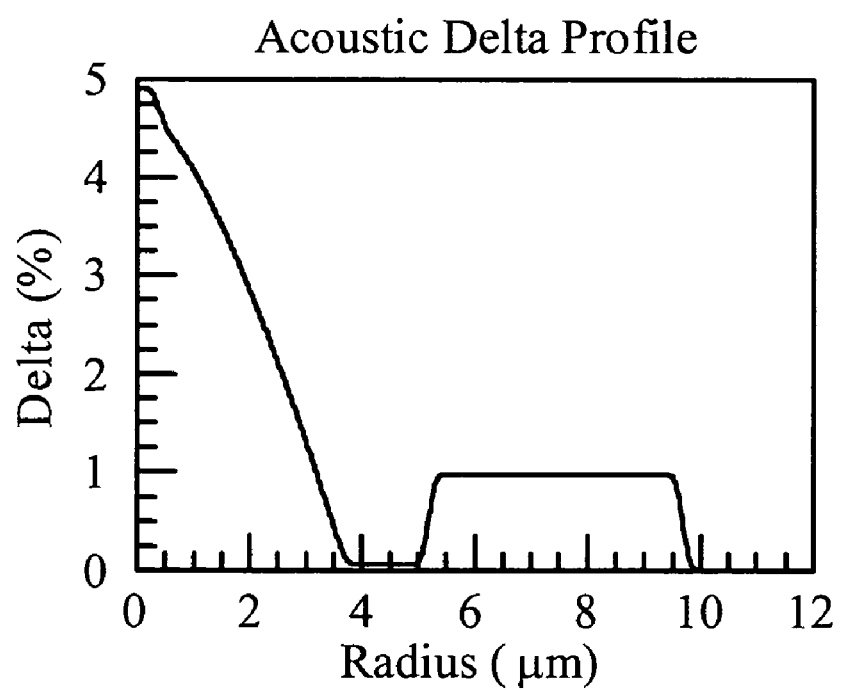
FIG. 12 illustrates the longitudinal acoustic delta profile of the optical fiber with the optical profile shown in FIG. 11.
Figure 13:
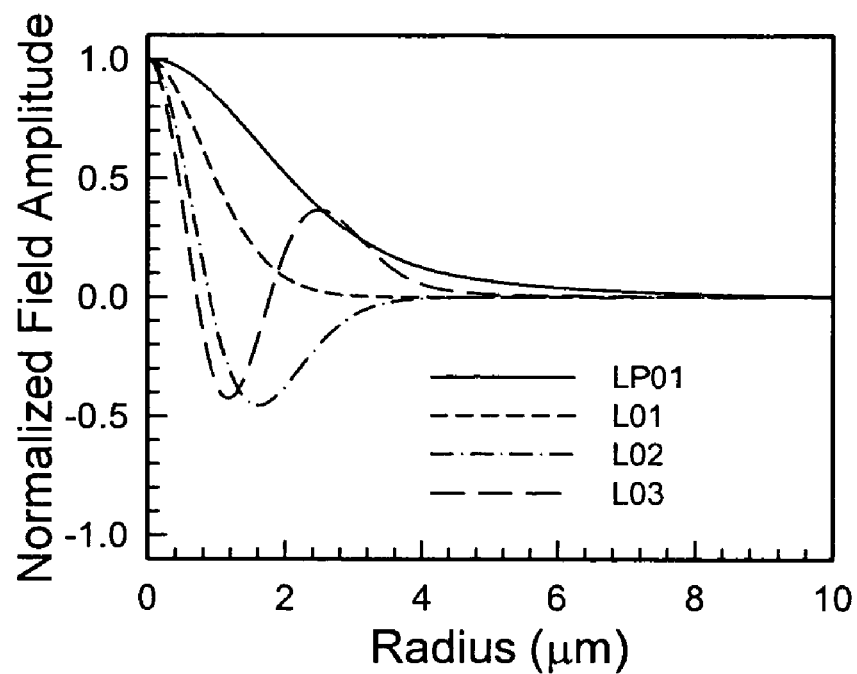
FIG. 13 is a plot of optical and longitudinal acoustic fields of the optical fiber that corresponds to the optical fiber with the optical delta profile shown in FIG. 11.

The optical delta profile and acoustic delta profile of a typical large area NZDSF fiber is shown in FIGS. 11 and 12 respectively. This fiber has a dispersion of 4.1 ps/nm/km at 1550 nm, Kappa of 48 nm at 1550 nm, dispersion of −15.73 ps/nm/km at 1310 nm, zero dispersion around 1500 nm, MFD of 9.82 µm at 1550 nm, MFD of 7.61 µm at 1310 nm, effective area of 72.52 µm$^2$ at 1550 nm. This fiber has an acoustic FOM of 114.35 µm$^2$. The optical field and longitudinal acoustic fields of this fiber are shown in FIG. 13.

Figure 14:
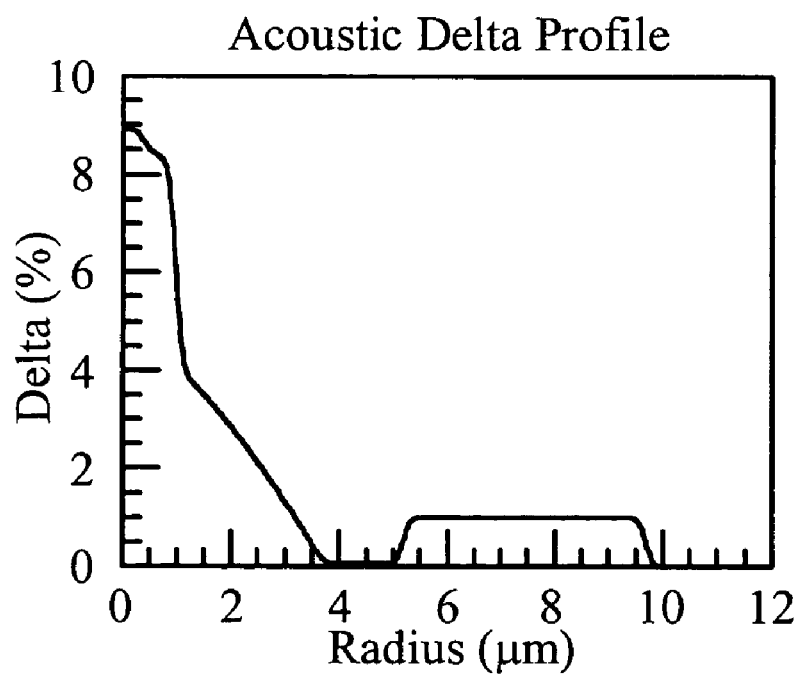
Figure 15:
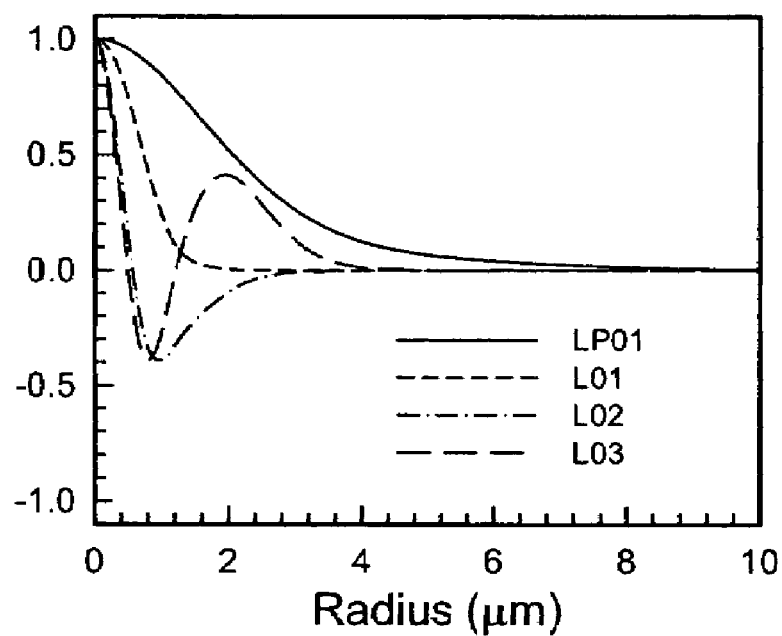
FIG. 15 is a plot of optical and longitudinal acoustic fields of the embodiment of the optical fiber that corresponds to the multi-step acoustic delta profile of FIG. 14.

Now, we consider a case where we have fluorine doped at first region 12a of the fiber core (corresponding to the radius r from 0 to 1 micron) to produce delta of −0.28% and then added Ge to this region, so that the overall optical delta profile is maintained the same as that shown FIG. 11. In this case, the optical properties of the fiber such as the dispersion, MFD and optical effective area are essentially the same as the case when the delta is purely formed by Ge doping. However, the acoustic delta profile has been changed. The acoustic delta profile of the altered fiber 10 is shown in FIG. 14. This optical fiber 10 has FOM of 212.37 mm$^2$ ($L_{01}$) and 219.9 mm$^2$ ($L_{02}$). The SBS threshold is improved from that of a standard large effective area NZDSF fiber by a factor of 1.86 or by 2.69 dB. The optical field $LP_{01}$ and longitudinal acoustic fields of this exemplary fiber 10 are shown in FIG. 15. It is seen that with the introduction of Fluorine doping in the fiber center, the optical field is unchanged, but the $L_{01}$ longitudinal acoustic field is confined to a much narrower region near the fiber center (i.e., core region 12a). The optical fiber 10 of this example has the Pin Array bending loss and the lateral load bending loss of 7.5 dB and 2.4 dB/km, respectively, at 1550 nm. This fiber has a cut-off wavelength at or below 1.7 µm and a cable cutoff of 1.5 µm.

EXAMPLE 4

Laser Fiber

Figure 16:
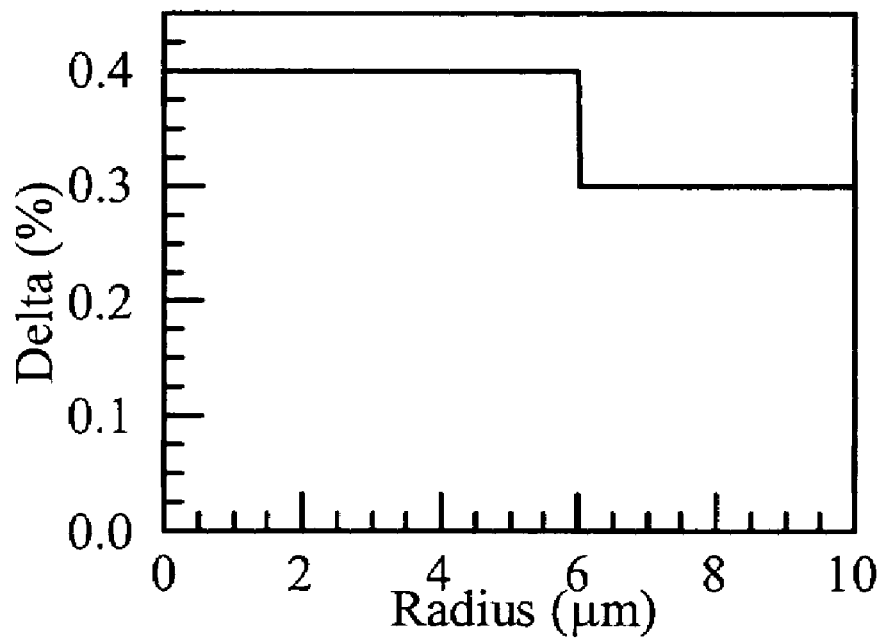
FIG. 16 illustrates the optical delta profile of an optical laser fiber.
Figure 17:
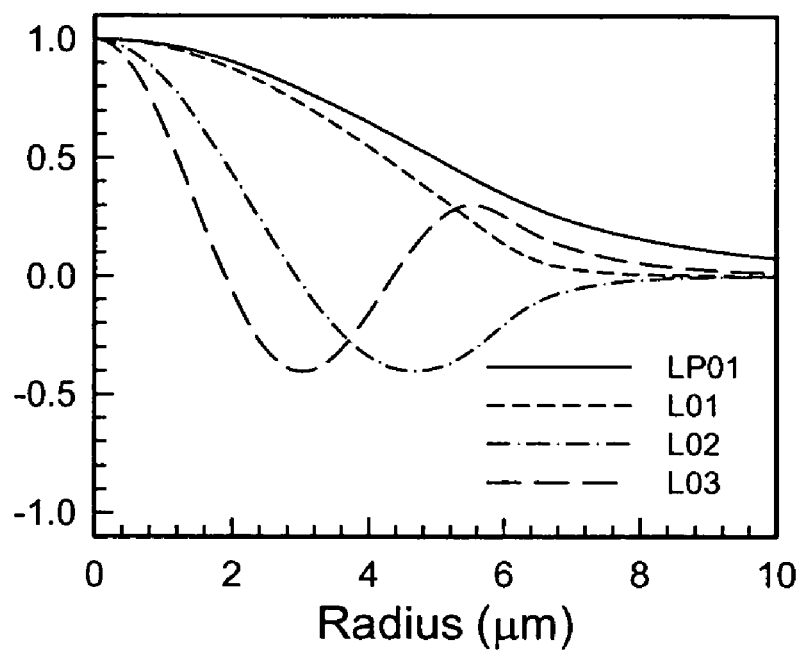
FIG. 17 is a plot of optical and longitudinal acoustic fields of the optical laser fiber that corresponds to the multi-step acoustic delta profile of FIG. 16.

A silica-based laser fiber with 0.1% delta between the core and the cladding is shown in FIG. 16. In this exemplary fiber, both the core and the cladding of are doped with Ge. The optical fiber core is also co-doped with a rare earth material, for example Nd, Tm, Er or Yb to provide amplification. This fiber has a MFD of 19.1 µm at 1550 nm and an optical effective area of 271.2 µm$^2$. The FOM of the $L_{01}$, mode that measures the SBS performance is 296.9 µm$^2$. The optical field and the longitudinal acoustic fields are shown in FIG. 17. More specifically, FIG. 17 illustrates that the optical field ($LP01$) and the acoustic field ($L01$) have an almost total overlap (i.e., there is very little area of no overlap) and both fields are spread over the entire width of the optical fiber core.

Figure 18:
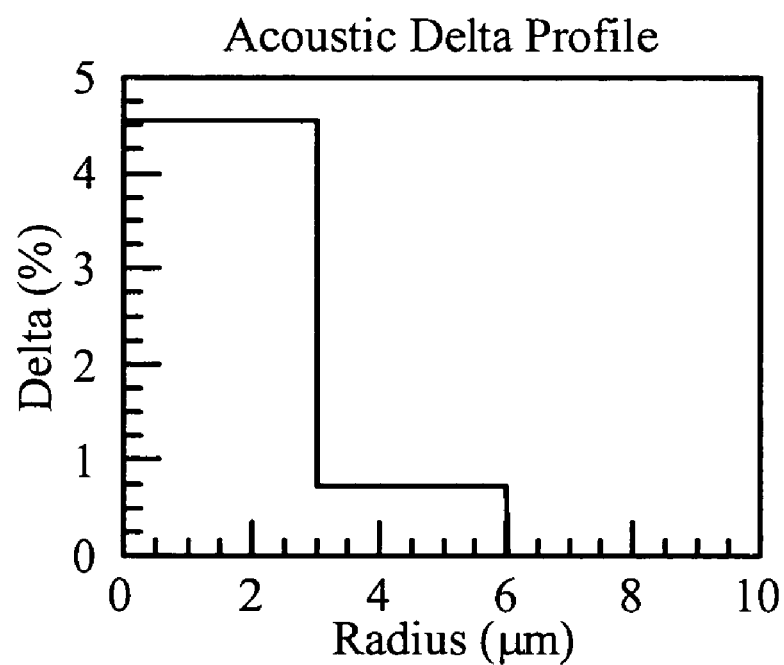
FIG. 18 illustrates the longitudinal acoustic delta profile of the optical fiber according to an embodiment of the present invention that has the optical delta profile shown in FIG. 16.
Figure 19:
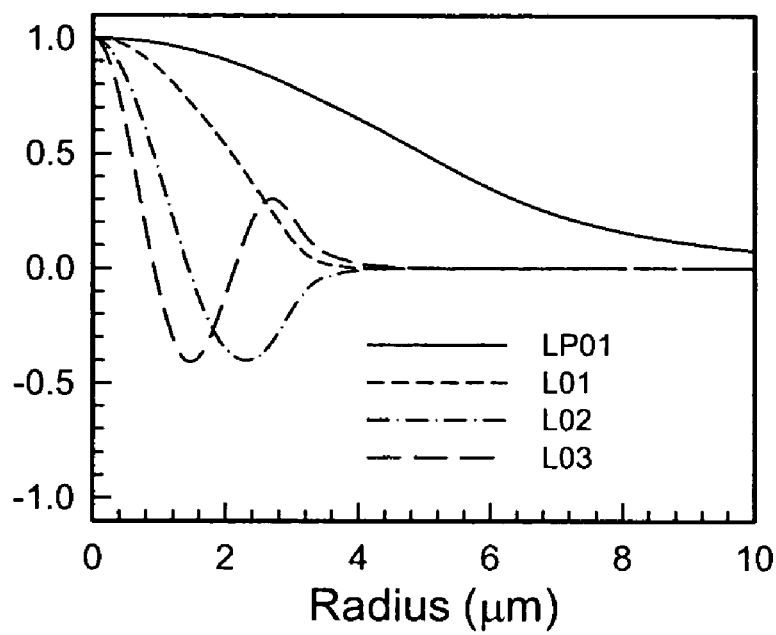
FIG. 19 is a plot of optical and longitudinal acoustic fields of the embodiment of the optical fiber that corresponds to acoustic delta profile of FIG. 18.

We then modified the composition of the fiber core by co-doping the core region 12a (radius from 0 to of 3.0 µm) with fluorine. The amount of fluorine lowered optical refractive index delta by −0.25% delta, thus Ge concentration in the core region 12a was increased to maintain the overall optical delta profile (FIG. 16). The acoustic delta profile of the resultant fiber 10 is shown in FIG. 18. FIG. 18 indicates a multi-step acoustic delta profile that accounts for different acoustic velocities in the core regions 12a and 12b. The velocities in the core regions 12a and 12b differ by 3.92% or around 230 m/s. Optical fiber 10 of this example has a FOM of 723.55 µm$^2$, which suggests that the SBS threshold has been increased by a factor of 2.42 or by 3.83 dB. The optical fields and the acoustic fields of this fiber 10 (with the optical and acoustic delta profiles shown in FIGS. 16 and 18) are illustrated in FIG. 19. It is found that fiber 10 forms a narrow and deep acoustic waveguide in the center of the acoustic field, improving the SBS threshold. It is preferable that the longitudinal acoustic velocities between two adjacent core regions differ by more than 100 m/s, more preferably by more than 200 m/s. The longitudinal acoustic velocities in the core regions 12a and 12b of the optical laser fiber 10 of this example differ by about 285 m/s with the longitudinal acoustic velocity in the core region 12a being 5617 m/s and that in core region 12b being 5902 m/s.

We can also improve the SBS performance of a laser fiber with larger core diameter. For example, in the case when the core diameter is changed to 25 µm$^2$, without the doping of Fluorine the fiber has a MFD of 22.8 µm, effective area of 437 µm$^2$ and FOM of L01 acoustic field of 436 µm$^2$ at 1550 nm. We then modified the composition of the fiber core by co-doping with fluorine in the core region 12a (radius 0 to 4.0 µm). The amount of fluorine contributes to optical refractive index delta by −0.2%, and the Ge concentration in the core region 12b was adjusted to provide 0.75 delta % to maintain the overall delta of 0.55% in the core. While the MFD and optical effective area are not changed, the FOM was changed to 1617.7 µm$^2$. The SBS threshold was increased by a factor of 3.7 or by 5.7 dB, compared to the optical fiber of FIG. 3a-3c.

EXAMPLE 5

Matching the Core and Cladding Longitudinal Velocity

Figure 20:
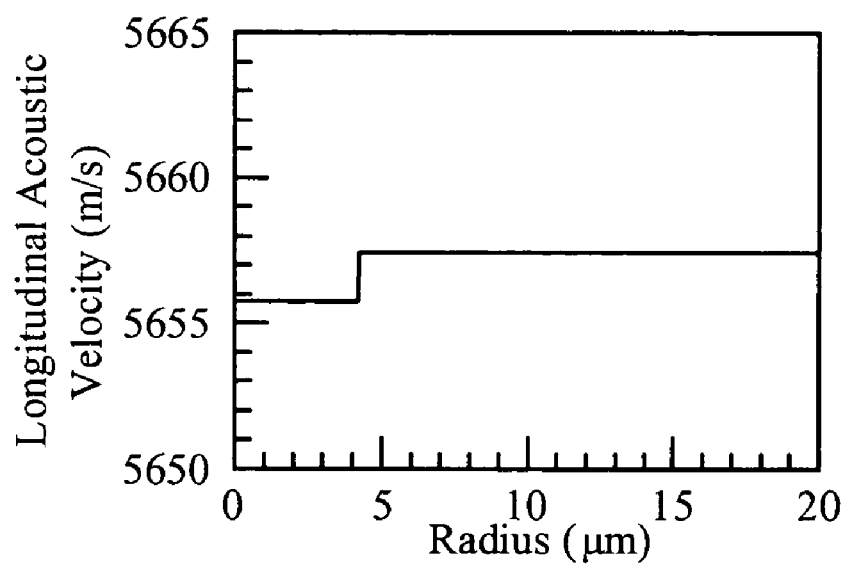
Figure 21:
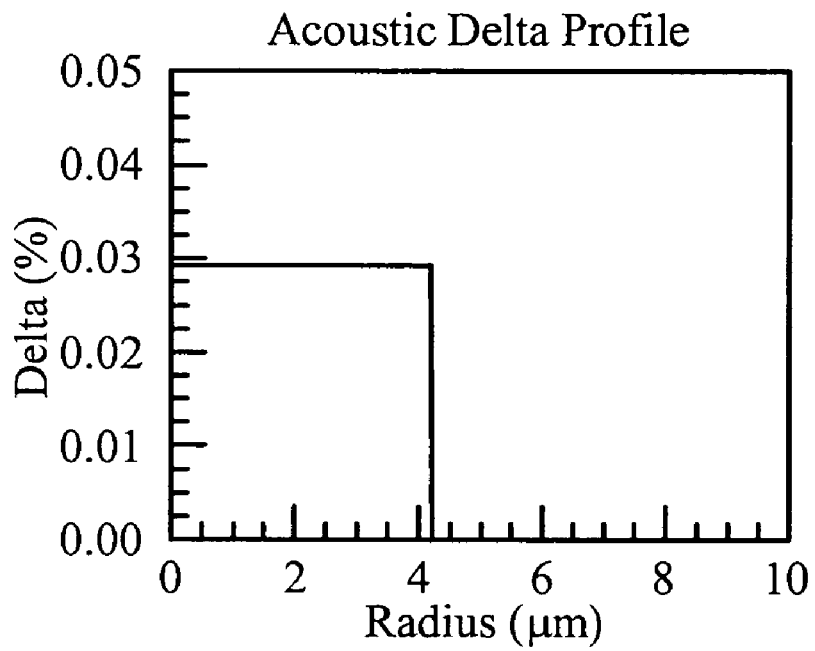
FIG. 21 illustrates the longitudinal acoustic delta profile of the optical fiber according to an embodiment of the present invention that has the optical delta profile shown in FIG. 3a, but has matched core and cladding acoustic velocities.

We have also discovered that when the core and the cladding longitudinal acoustic velocities are the same or almost the same (i.e., matched) we can achieve very good SBS improvement. Again, we consider a fiber with a simple step-index optical delta profile shown in FIG. 3a. This fiber has a MFD of 10.22 µpm, effective area of 80.13 µm, and chromatic dispersion of 16.71 ps/(nm.km) at 1550 nm. The FOM of this optical fiber is 82.2 µm. Then we modified the composition of the optical fiber to create new, improved fiber 10 by doping the fiber core and the cladding with −0.1 delta % and −0.262 delta % amount of F, respectively, while increasing the Ge to maintain optical delta profile shown in FIG. 3a. The improved fiber 10 has a FOM of 182.5 µm², which is a factor of 2.2 or 3.46 dB improvement in SBS threshold, over the initial fiber. In this exemplary optical fiber 10, the longitudinal acoustic velocities of the core 12 and the cladding 14 are very close, as shown by FIG. 20. The close match is also shown in the acoustic delta profile in FIG. 21, which shows delta difference between the core and the cladding of about 0.03%. It is noted that in order to improve the SBS threshold significantly, the match between the core and cladding in terms of longitudinal velocity or acoustic delta must be very close, preferably within 0.03%. If we change the fluorine contributed delta in the cladding to −0.26%, the FOM of the fiber 10 becomes 102.4 mm², and the SBS threshold is reduced by a factor of 1.24 or 0.95 dB. Preferably, the acoustic velocities between the core and the cladding of this type of fiber 10 are different no more than 0.3% and more preferably by no more than 0.1% and most preferably by no more than 0.05%. Also preferably, the difference between the core acoustic velocity $v_1$ and the cladding acoustic velocity $v_2$ (i.e., $|v_1-v_2|$) for this type of fiber 10 is no more than 60 m/s, preferably, less than 25 m/s, more preferably less more than 10 m/s, even more preferably less than 5 m/s and most preferably less than 3 m/s.

EXAMPLE 6

Optical Fiber with Smooth Change of Fluorine Doping Level

Figure 22:
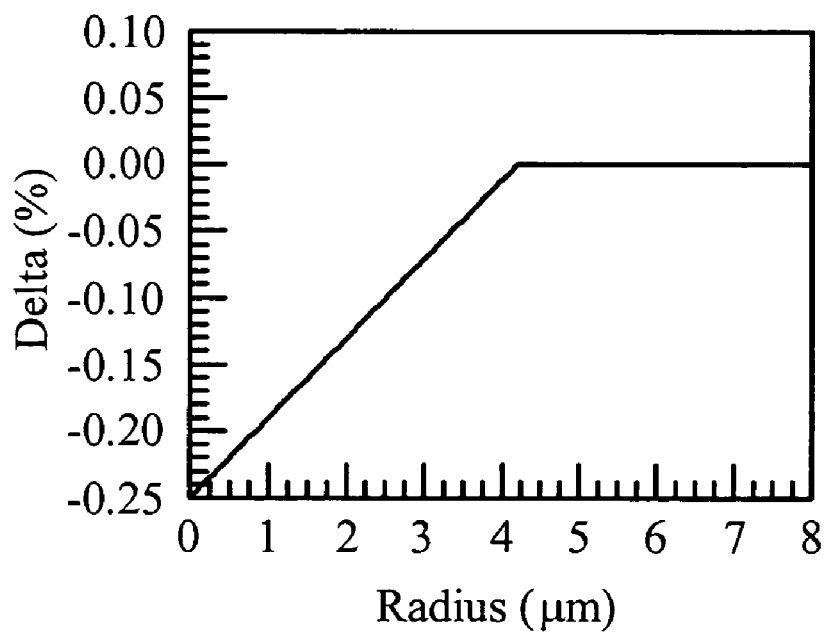
FIG. 22 is an optical refractive delta % contribution due to F dopant in the fiber core of another exemplary fiber.
Figure 23:
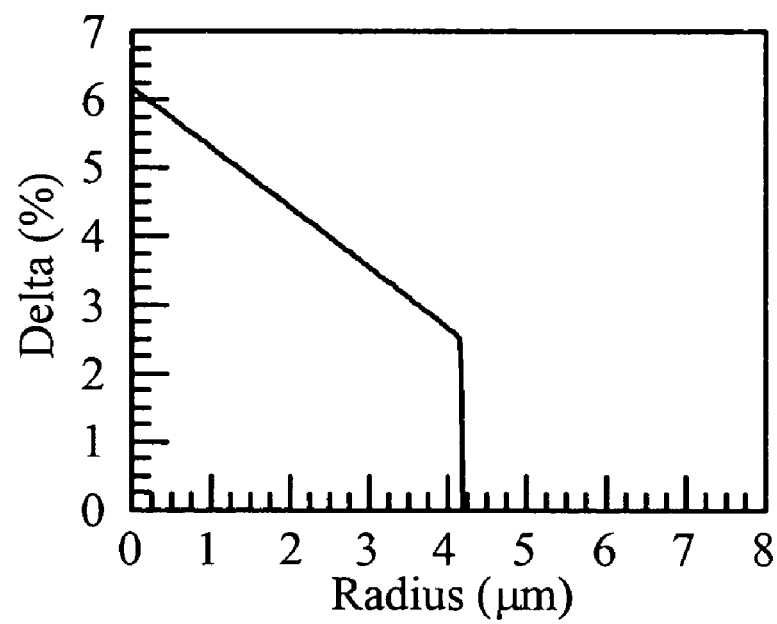
FIG. 23 is an acoustic delta profile of the optical fiber corresponding to FIG. 21.
Figure 24:
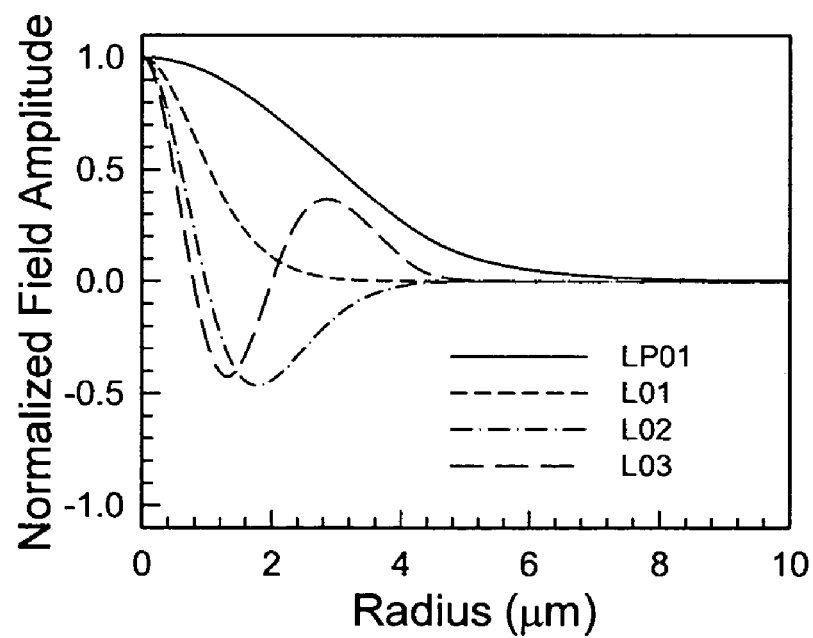
FIG. 24 is a plot of optical and longitudinal acoustic fields of the embodiment of the optical fiber that corresponds to FIGS. 22 and 23.

According to another embodiment of the present invention the optical fiber 10 has a core 12 and the cladding 14 doped such that the dopant level of Fluorine does not change abruptly between the adjacent regions, but a very smooth change. In this example, the core 12 is not clearly divided into two easily defined regions as in other embodiments. However, one can find at least 2 regions with a different amount of F dopant, and thus different acoustic velocities. In this exemplary fiber 10, the overall optical delta profile is maintained as FIG. 3a while the level of Fluorine is changed linearly from the center of the core to the edge of the core as shown in FIG. 22. Since Fluorine is a down-dopant, when more fluorine is added, the optical delta takes a more negative value, which is then compensated by adding more Ge up-dopant. The corresponding acoustic delta profile is shown in FIG. 23. The higher value of the acoustic delta near the central core helps confining the acoustic field in the central region of the core, resulting in reduction of the overlap between the LP01 optical field and the acoustic fields. The FOM of this fiber is 174.0 µm², which is a factor of 2.11 or 3.26 dB over the step index fiber with only Ge dopant. The optical field and acoustic fields are shown in FIG. 24. It is found that the fundamental acoustic field is pushed away from the center of the core while the LP01 remains in the center of the core.

Preferably, the optical fiber disclosed herein has a silica-based core and cladding. In preferred embodiments, the cladding has an outer diameter of about 125 µm. Preferably, the outer diameter of the cladding has a constant diameter along the length of the optical fiber. In preferred embodiments, the refractive index of the optical fiber has radial symmetry.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
   a core having a refractive index profile and a centerline; and
   a cladding layer surrounding and directly adjacent the core;
   wherein core includes updoping material and is doped with F in at least one region of the core, such that either:
   (a) the average longitudinal acoustic wave velocity within the core is within 0.05% of the longitudinal acoustic wave velocity within the cladding; or
   (b) the longitudinal acoustic wave velocity at one region of the core is different from the longitudinal velocity at another region of the core by at least 0.2%.

2. The optical fiber according to claim 1, said least one of said core regions is doped with Ge and F, such that the longitudinal acoustic wave velocities in two adjacent core regions differ by at least 0.2%.

3. The optical fiber according to claim 1, wherein one of said core regions includes Ge doped silica and the adjacent core region includes Ge and F doped silica.

4. The optical fiber according to claim 3, wherein the central core region includes Ge doped silica and the adjacent core region surrounding the central core region includes Ge and F doped silica.

5. The optical fiber according to claim 3, wherein the central core region includes Ge and F co-doped silica and the adjacent core region surrounding the central core region includes Ge doped silica and does not include F doped silica.

6. The optical fiber according to claim 3, wherein said one core region and said adjacent core region are doped with both Ge and F, herein the amounts of Ge and F are different in these two regions.

7. The optical fiber according to claim 1, wherein said cladding layer is F doped silica cladding.

8. The optical fiber according to claim 1, wherein said cladding layer is a pure silica layer.

9. The optical fiber according to claim 1, wherein said two adjacent core regions have the same refractive index.

10. An optical fiber comprising:
    a F doped core having a refractive index profile and a centerline, the core comprising a first region having an acoustic delta $\Delta_1$ and a second region directly adjacent the first region and having an acoustic delta $\Delta_2$ wherein $\Delta_1$ does not equal to $\alpha_2$, said two core regions having a substantially equal optical relative refractive index, and
    a cladding layer surrounding and directly adjacent the core;
    wherein the optical fiber has an attenuation at 1550 nm;

wherein the refractive index of the core is selected to provide an overlap integral between the fundamental optical mode and a fundamental acoustic mode of less than 0.8 at 1550 nm.

11. The optical fiber according to claim 10, wherein said overlap integral is less than 0.65.

12. The optical fiber according to claim 10, wherein said overlap integral is less than 0.5.

13. An optical fiber comprising:
   a F doped core having a refractive index profile and a centerline, the core comprising a first region having an acoustic delta $\Delta_1$ and a second region directly adjacent the first region and having an acoustic delta $\Delta_2$ wherein $\Delta_1$ does not equal to $\Delta_2$, said two core regions having a substantially equal optical relative refractive index, and
   a cladding layer surrounding and directly adjacent the core;
wherein one of first region has more than 0.1 mole % F and said second region has less than 0.1 mole % of F, and at least one of said regions is co-doped with Ge and F.

14. The optical fiber according to claim 13, wherein said first region has a radius of no more than 2 μm and said second region has a radius of 2 μm or more.

15. The optical fiber according to claim 13, wherein said first region has an outer radius of no more than ⅓ of the fiber core radius and said second region has an outer radius greater than ⅓ more of the fiber core radius.

16. An optical fiber comprising:
   a core having a refractive index profile and a centerline; and
   a cladding layer surrounding and directly adjacent the core;
wherein core includes, in at least one region of the core, an updoping material and a downdopant that decreases acoustic velocity, such that either:
   (a) the average longitudinal acoustic wave velocity within the core is within 0.05% of the longitudinal acoustic wave velocity within the cladding; or
   (b) the core includes at least two adjacent core regions, such that the longitudinal acoustic wave velocities within the two core regions differ by at least 0.2%.

* * * * *

UNITED STATES PATENT AND TRADEMARK OFFICE
CERTIFICATE OF CORRECTION

| | | |
|---|---|---|
| PATENT NO. | : 7,228,039 B2 | Page 1 of 1 |
| APPLICATION NO. | : 11/450785 | |
| DATED | : June 5, 2007 | |
| INVENTOR(S) | : Scott Bickham et al. | |

It is certified that error appears in the above-identified patent and that said Letters Patent is hereby corrected as shown below:

Col.   Line                                        *Description*

1     4     Please add the following <u>new</u> paragraph on page 1 prior to the priority claim paragraph. line 4

This invention was made with Government support under Cooperative Agreement No. MDA972-02-3-0004 awarded by The Defense Advanced Research Projects Agency. The Government may have certain rights in some of the claims of this invention.

Signed and Sealed this

Second Day of December, 2008

JON W. DUDAS
*Director of the United States Patent and Trademark Office*